United States Patent [19]

Gray

[11] Patent Number: 5,321,760
[45] Date of Patent: Jun. 14, 1994

[54] RETRACTABLE SPEAKER ASSEMBLY

[75] Inventor: John D. Gray, Union, N.H.

[73] Assignee: Davidson Textron Inc., Dover, N.H.

[21] Appl. No.: 977,235

[22] Filed: Nov. 16, 1992

[51] Int. Cl.$^5$ .............................................. H04B 1/00
[52] U.S. Cl. ...................................... 381/86; 181/150;
381/90; 381/188; 381/205
[58] Field of Search .................. 381/86, 87, 88, 90, 381/205, 188; 181/150, 171

[56] References Cited

U.S. PATENT DOCUMENTS 4,441,577  4/1984  Kurihara ................................ 381/86
4,630,303 12/1986  Tanno .................................... 381/87
4,811,406  3/1989  Kawachi ................................ 381/86

Primary Examiner—Forester W. Isen
Attorney, Agent, or Firm—Reising, Ethington, Barnard, Perry & Milton

[57] ABSTRACT

A retractable speaker assembly for an automobile is disclosed which includes a housing containing at least one loudspeaker, a first actuator for selectively moving the housing between a retracted position and an extended position, and a second actuator for rotating the housing sideways so that the speaker can be directed toward the left or right side of the automobile interior. The actuators are remotely controlled by the driver or other occupant of the automobile

17 Claims, 2 Drawing Sheets

5,321,760

RETRACTABLE SPEAKER ASSEMBLY

TECHNICAL FIELD

This invention relates generally to an assembly for positioning an automobile loudspeaker to permit orientation of the loudspeaker in accordance with the listener's preferences and to minimize the presence of the loudspeaker on the aesthetic quality of the automobile interior when the speaker is not in use. More particularly, it relates to an assembly for selectively indexing and/or rotating an automobile ledge speaker from a retracted position to an extended position in which the speaker is directed generally toward the automobile occupants.

BACKGROUND OF THE INVENTION

In any stereo system, there are a variety of means available to increase listening pleasure. The more common of these include utilization of high quality recording media (e.g., compact disc rather than cassette tape) and control of the characteristics of the signal sent to the loudspeakers (e.g., attenuation or gain of the signal at various frequencies and control of the relative signal strength between the different speakers in the system).

With respect to a given loudspeaker, the most that can typically be done to increase listening pleasure is to orient the speaker either by itself or in relation to other speakers. However, the positions of automobile loudspeakers are typically fixed within the automobile, whether they are mounted in the door panel, the front or rear window ledge, or otherwise. The automobile occupants are therefore captive to the particular speaker arrangement provided by the automobile manufacturer. Moreover, automobile window ledge speakers are conventionally mounted flush with the surface of the window ledge. While this arrangement permits the loudspeaker to be virtually hidden, minimizing its impact on the aesthetic look of the automobile interior, it results in the sound emanating from the speaker being directed upwards rather than toward the automobile occupants.

To better direct the loudspeaker output toward the occupants, rear window ledge speakers have been mounted on top of the rear window ledge such that the speaker faces forward toward the occupants. See, for example, U.S. Pat. No. 4,630,303, issued Dec. 16, 1986 to T. Tanno, which discloses an automobile speaker system that is located upon the rear window ledge and which includes a high range speaker that is designed to extend upwardly and slant forwardly to avoid attenuation of high range sounds due to the interposition of a rear seat, backrest, or head rest between the high range unit and the listener. Although suitable for its intended purpose, the arrangement disclosed in that patent suffers from several disadvantages. Firstly, control over positioning of the speaker is limited. The position of the low range unit cannot be changed and orientation of the high range unit is limited to elevational changes. Secondly, the presence of the speakers is highly conspicuous, which for many automobile interior designs is undesirable. Thirdly, the system cannot be implemented with a single speaker, nor can it be implemented with coaxial or triaxial speakers commonly used in automotive applications, as the high and low range speakers must be physically separate components that are movable with respect to each other.

SUMMARY OF THE INVENTION

The above-mentioned shortcomings of prior art automobile speaker arrangements are overcome by a retractable speaker assembly of the present invention which includes a housing in which at least one loudspeaker is mounted and an actuator for selectively moving the housing vertically between a retracted position and an extended position. The housing rotates such that, when extended, the speaker can be directed to the left or right side of the automobile interior. This sideways rotation can be provided by a second actuator. Preferably, both actuators are electrically operated devices remotely controlled from the instrument panel, steering wheel, sound system components, or some other console. The housing can be movably mounted on or coupled to a frame so that vertical and sideways movement of the housing occurs with respect to the frame. The actuators can be electric, pneumatic, hydraulic, or other devices which provide mechanical motion to move the housing. Similarly, the housing can be configured to move via gears, belts, pulleys, or any other suitable means. Preferably, the housing is positionable at any location along the vertical and sideways paths of movement.

A speaker assembly constructed in accordance with the present invention permits any single automobile loudspeaker to be individually oriented for maximum listening enjoyment. The combination of vertical and sideways positioning, especially when used in conjunction with the balance and/or fader controls of the automobile stereo system, provides a great deal of flexibility in adjusting the overall sound of the system. Moreover, the maximum sideways and elevational rotations need not be very large to provide suitable variation of the overall sound. The present invention further permits the sound system to be adjusted to increase listening pleasure at particular locations within the automobile interior. This is advantageous when the driver is the sole occupant of the automobile.

The housing can be configured to extend between the retracted and extended positions along any desired path. In one embodiment, the housing is positioned flush with the surface of the window ledge when in its retracted position and is configured to rotate upwards about a horizontal axis to a position where the loudspeaker is generally directed towards the automobile occupants. In another embodiment, the housing extends upwards and then rotates to direct the speaker towards the occupants. In yet a third embodiment, the housing simply indexes vertically with the speaker being mounted within the housing such that it is generally directed towards the occupants.

Preferably, the housing is substantially if not completely below the surface of the window ledge when in its retracted position. This minimizes the impact of the speaker assembly on the aesthetic look of the automobile interior and minimizes interference of the speaker assembly with the operator and other occupants' view through the windows.

BRIEF DESCRIPTION OF THE DRAWINGS

The preferred exemplary embodiments of the present invention will hereinafter be described in conjunction with the appended drawings, wherein like designations denote like elements, and.

DESCRIPTION OF THE PREFERRED EMBODIMENTS

Figure 1:
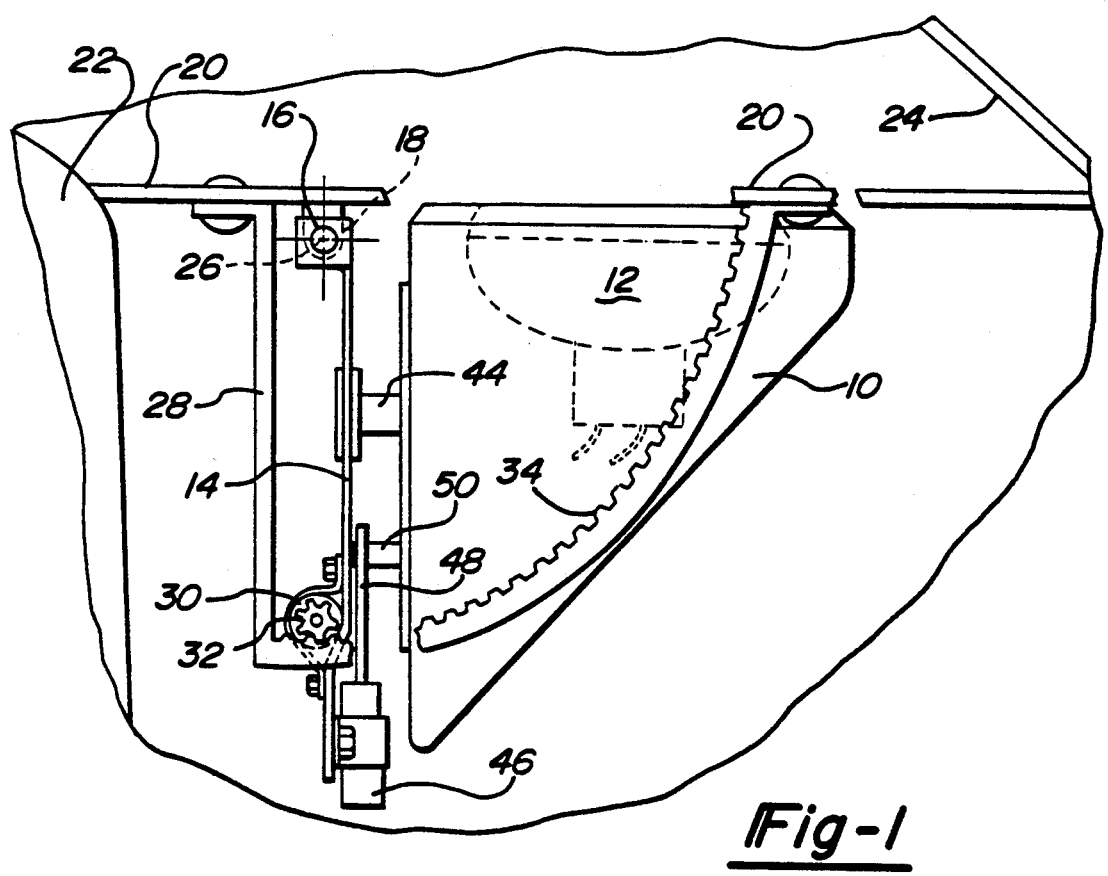
FIG. 1 is a side view of one embodiment of the speaker assembly of the present invention in its retracted position.
Figure 2:
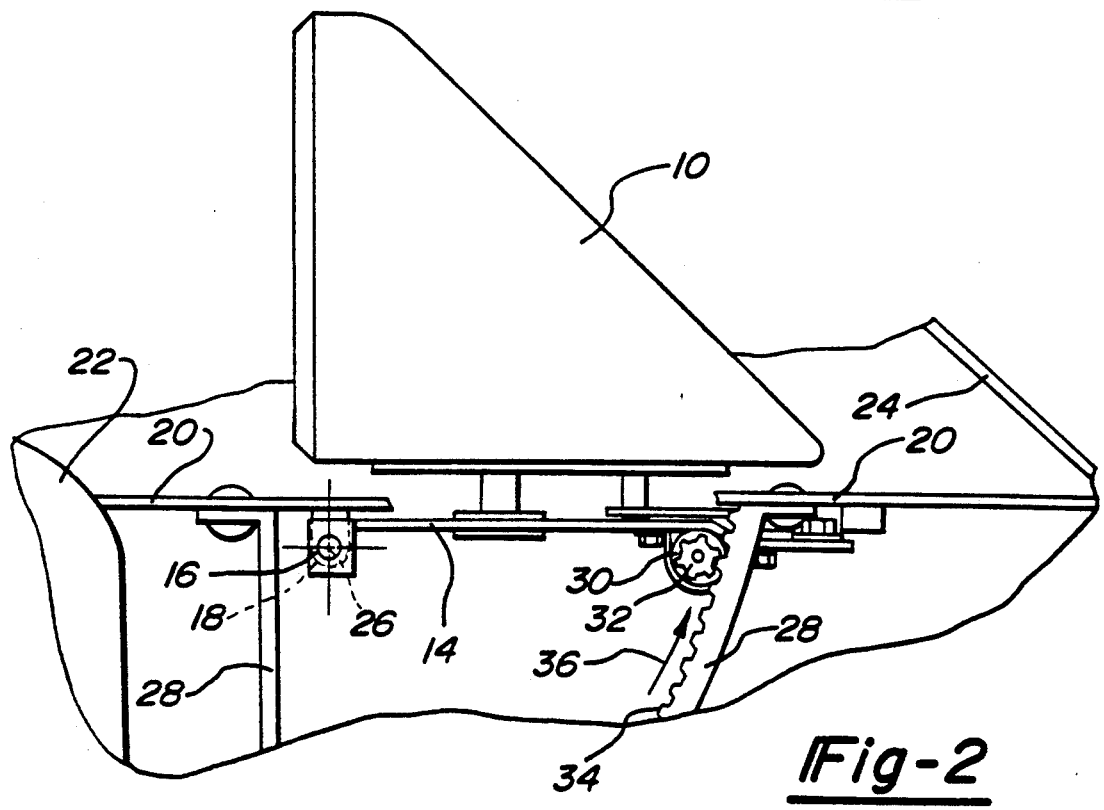
FIG. 2 is a side view of the speaker assembly of FIG. 1 in its extended position.
Figure 3:
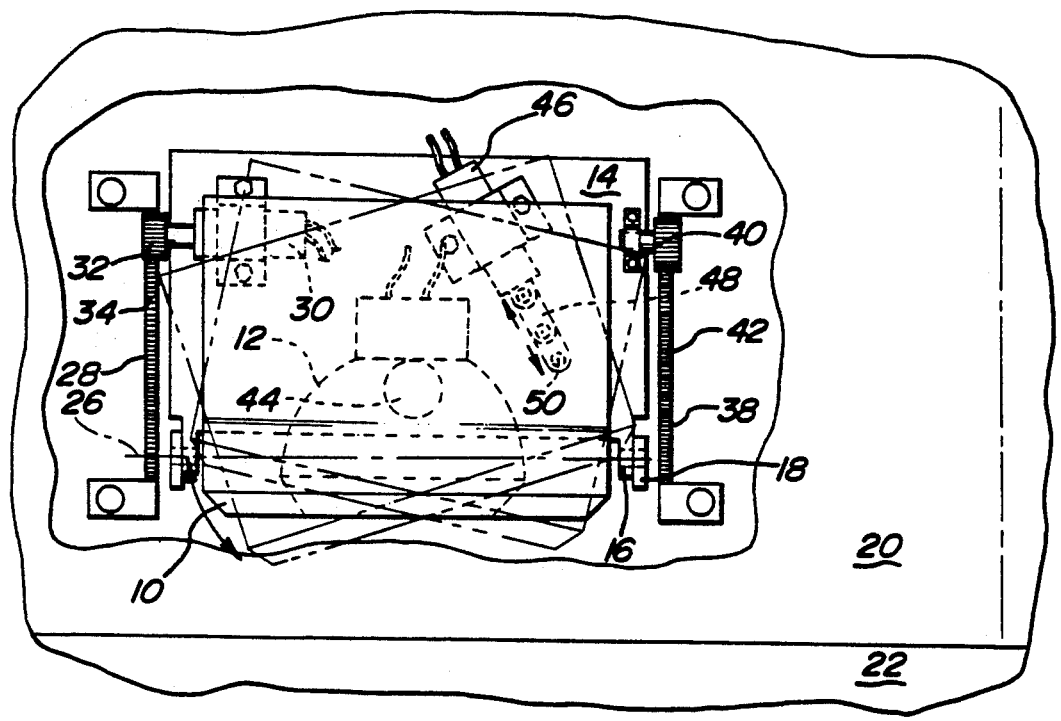
FIG. 3 is a top view of the speaker assembly of FIG. 2 showing the sideways rotation feature of the present invention.

Referring to the embodiment shown in FIGS. 1-3, a speaker assembly of the present invention includes a housing 10 in which is mounted a speaker 12. Housing 10 is mounted on a platform 14 which is attached by trunnions 16 to corresponding mounts 18. Mounts 18 are secured to an automobile window ledge 20 that extends between a rear seat 22 and a rear window 24 of the automobile. As will be described below, housing 10 is capable of rotation about an axis 26 extending through the center of trunnions 16.

Housing 10 is coupled to a frame 28 via an actuator 30 mounted on the underside of platform 14. Actuator 30 has a spur gear 32 mounted on its drive shaft. Gear 32 mates with teeth 34 formed on frame 28. The set of teeth 34 form a circular arc centered on axis 26 of trunnions 16. Operation of actuator 30 in the clockwise direction causes platform 14, and thus housing 10, to rotate upwards about axis 26 from the retracted position shown in FIG. 1 to the extended position shown in FIG. 2, as indicated by arrow 36. Operation of actuator 30 in the opposite direction will cause housing 10 to rotate downwards toward the retracted position. As shown in FIG. 3, three of the four corners of platform 14 are supported by the trunnions 16 and spur gear 32 of actuator 30. The fourth corner can be supported on a second frame member 38 by a second spur gear 40 which is mounted to platform 14 to freely rotate via teeth 42 formed on frame member 38 as platform 14 is extended or retracted using actuator 30.

Housing 10 is pivotally mounted to platform 14 via a shaft 44 to enable left-right (i.e., sideways) rotation of housing 10. As best seen in FIGS. 1 and 3, sideways rotation of housing 10 is achieved by an actuator 46 mounted on the topside of platform 14. Actuator 46 has a plunger 48 which is attached to a pivot pin 50 that is secured to the bottom of housing 10. As seen in FIG. 3, plunger 48 has at least three positions corresponding to left facing, front facing, and right facing positions. Preferably, actuator 46 allows positioning of plunger 48 at any location between the left and right facing positions. The degree of rotation between the front and right facing positions and the front and left facing positions need not be the same. Rather, it may be desirable to vary the relative amounts of left and right rotation depending upon how close to the left or right side of the automobile interior the speaker assembly is located. As shown in FIG. 3, the amount of rotation between the front and right facing positions is approximately twelve degrees while the amount of rotation between the front and left facing positions is approximately eighteen degrees. Of course, the particular direction and degree of rotation can be selected as desired for a particular application and is not important to the practice of the invention. Furthermore, if desired, the sideways rotation can be disabled until housing 10 is at least partially extended from its retracted position.

Figure 4:
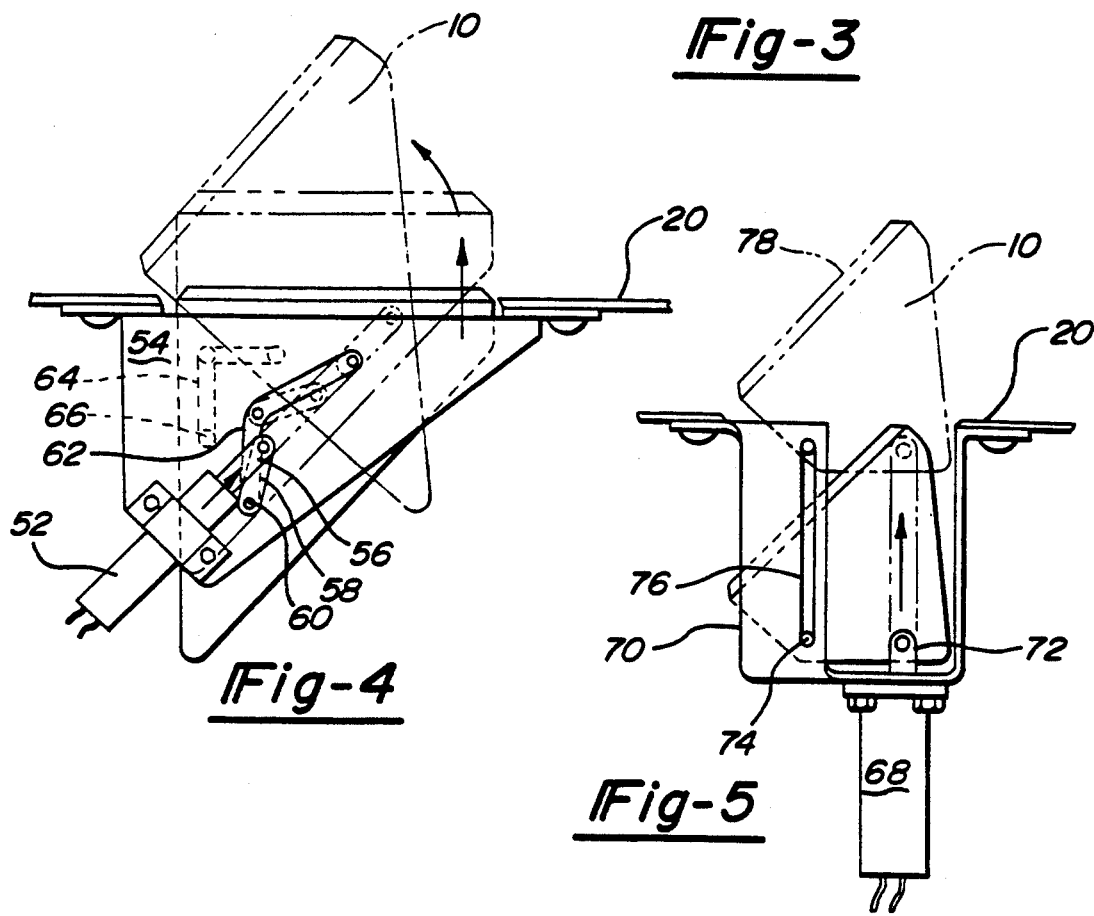
FIG. 4 is a diagrammatic representation of a second embodiment of the present invention.
Figure 5:
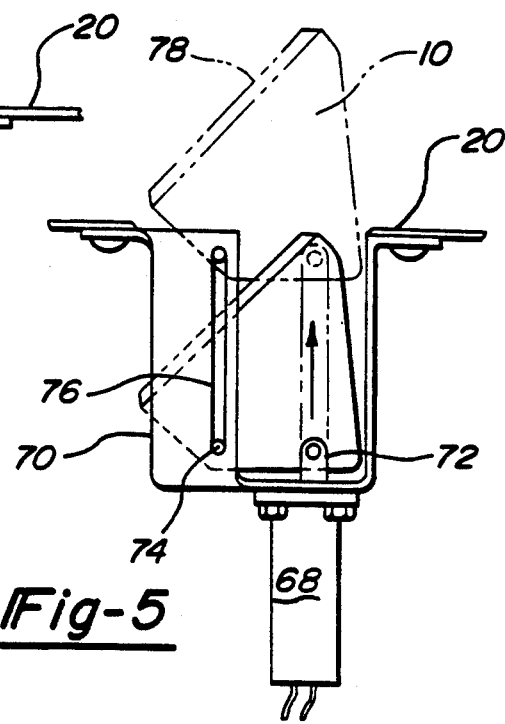
FIG. 5 is a diagrammatic representation of a third embodiment of the present invention.

Two other embodiments are shown in FIGS. 4 and 5. The embodiments differ from that shown in FIGS. 1-3 primarily in the vertical motion that the housing undergoes when moving between its retracted and extended positions. Accordingly, FIGS. 4 and 5 only show the structure necessary to effect that vertical motion, it being understood that an arrangement similar to that shown in FIGS. 1-3 could be utilized to provide sideways rotation of housing 10 in FIGS. 4 and 5.

The embodiment shown in FIG. 4 utilizes an actuator 52 mounted on the lower end of a frame 54. Frame 54 is mounted on the underside of ledge 20. Actuator 52 indexes and rotates housing 10 upwards from its retracted position to its extended position. Actuator 52 has a plunger 56 which is pivotally mounted to one end of a translation arm 58. The other end of arm 58 is attached to a pin 60 connected to housing 10. Pin 60 also extends through a boomerang-shaped guide slot 62 formed in frame 54. Frame 54 also contains a second, L-shaped guide slot 64. A second pin 66 attached to housing 10 extends into slot 64. As plunger 56 extends out of actuator 52, arm 58 moves pin 60 along a path determined by slot 62 causing housing 10 to move. Movement of housing 10 due to pin 60 causes pin 66 to move through slot 64. The paths defined by slots 62 and 64 cause housing 10 to first extend vertically upwards and then rotate forward when plunger 56 moves to its fully extended position.

The embodiment shown in FIG. 5 utilizes an actuator 68 mounted on the lower end of a frame 70. Frame 70 is mounted on the underside of ledge 20. Actuator 68 indexes housing 10 upwards from its retracted position to its extended position. Actuator 68 has a plunger 72 which is attached to housing 10. Housing 10 has a pin 74 attached thereto which extends into a straight guide slot 76 formed in frame 70. As plunger 72 extends out of actuator 68, housing 10 moves upwards and maintains its orientation due to the movement of pin 74 being confined by the shape of slot 76. In this embodiment, the front face 78 of housing 10 (through which the speaker, not shown, is directed) is angled toward the front of the automobile.

Although the preferred embodiments have been described in conjunction with an automobile rear window ledge, it will be appreciated that they could also be used on a front window ledge or other suitable location within the automobile interior. When used on a front window ledge, the speakers preferably rotate into and out of the extended position.

The actuators shown in the various embodiments are diagrammatic only. As will be understood by those skilled in the art, these actuators can be electric, pneumatic, hydraulic, or other devices which provide mechanical motion to move the housing. Preferably, the actuators are remotely controlled from, for example, the instrument panel. Moreover, it will be understood that any of the various actuators described herein can be prevented from attempting movement past the ends of the range of movement for that particular actuator by the use of limit switches or other suitable means.

It will thus be apparent that there has been provided in accordance with the present invention a retractable speaker assembly which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, housing 10 can be shaped to minimize clearance between housing 10 and the edges of the opening in ledge 20 at all positions along the path between the retracted and extended positions to prevent objects from falling into the opening in ledge 20. All such variations and modifications are intended to come within the spirit and scope of the appended claims.

I claim:

1. A retractable speaker assembly for selectively extending and retracting a singular full range speaker relative to a substantially horizontal automobile window ledge, comprising:
   a housing adapted to be vertically extendable through an opening in the window ledge;
   a singular full range speaker attached to said housing; and
   an actuator for selectively moving said housing along a path between a retracted position where said housing and speaker are substantially flush with the window ledge and an extended elevated position where said housing and speaker are elevated free of and above the window ledge;
   said housing being adapted to rotate free of the window ledge about an axis when in said extended elevated position to permit sideways rotation of said housing and speaker above the window ledge.

2. A speaker assembly as defined in claim 1, further comprising a second actuator for effecting sideways rotation of said housing about said axis.

3. A speaker assembly as defined in claim 2, wherein said speaker is disposed in a substantially horizontal position when in said retracted position and said housing is disposed to rotate upwards from said retracted position about a horizontal axis, whereby said path is arcuate.

4. A speaker assembly as defined in claim 3, wherein said first actuator comprises an electric motor configured to rotate said housing by at least forty-five degrees when moving from said retracted position to said extended elevated position.

5. A speaker assembly as defined in claim 3, wherein said second actuator comprises an electric motor configured to rotate said housing through at least twenty degrees of sideways rotation 6. A speaker assembly as defined in claim 3, wherein said first actuator is configured to permit said housing to be positioned at any of a plurality of positions along said path.

7. A speaker assembly as defined in claim 1, wherein said path is substantially straight.

8. A speaker assembly as defined in claim 7, further comprising an electric motor configured to rotate said housing through at least twenty degrees of sideways rotation.

9. A speaker assembly as defined in claim 8, wherein said actuator is configured to permit said housing to be indexed to any of a plurality of positions along said path.

10. A speaker assembly selectively extendable through an opening in a substantially horizontal automobile rear window ledge, comprising:
    a frame mounted below and proximate the opening of the window ledge;
    a singular full range speaker attached to said housing;
    a housing disposed on said frame and movable with respect thereto between a retracted inconspicuous position where said housing and speaker are substantially flush with the window ledge position and an extended elevated position where said housing and speaker are elevated free of and above the window ledge, said housing being pivotable about a generally vertical axis free of the window ledge when said housing is in said extended position, said housing being located generally within and below the opening in the window ledge when said housing is in said retracted position;
    a first actuator for controlling movement of said housing about said vertical axis;
    a second actuator for selectively extending and retracting said housing; and
    a control device connected to said first and second actuators by a plurality of conductors for remote operation of said actuators, whereby said actuators are capable of being operated by an automobile occupant situated in the front portion of the automobile.

11. A speaker assembly as defined in claim 10, wherein said housing is capable of moving vertically upwards along a generally straight line and said housing is attached to said frame to rotate about a central horizontal axis, whereby, when moving from said retracted position to said extended position, said housing moves vertically upwards and rotates about said horizontal axis such that said speaker is directed generally toward the front portion of the automobile.

12. A speaker assembly as defined in claim 11, wherein said first and second actuators comprise electric motors.

13. A retractable speaker assembly for selectively extending and retracting a speaker from an automobile window ledge, comprising:
    a housing adapted to be vertically extendable from the window ledge;
    a speaker attached to said housing; and
    an actuator for selectively moving said housing along a substantially straight path between a retracted position and an extended position;
    said housing being adapted to rotate about an axis when in said extended position to permit sideways rotation of said housing.

14. A speaker assembly as defined in claim 13, further comprising an electric motor configured to rotate said housing through at least twenty degrees of sideways rotation.

15. A speaker assembly as defined in claim 13, wherein said actuator is configured to permit said housing to be indexed to any of a plurality of positions along said path.

16. A speaker assembly selectively extendable through an opening in an automobile rear window ledge, comprising:
    a frame mounted below and proximate the opening of the window ledge;
    a housing disposed on said frame and movable with respect thereto along a generally straight line between a retracted position and an extended position, said housing being pivotable about a generally vertical axis when said housing is in said extended position, said housing being located generally within and below the opening in the window ledge when said housing is in said retracted position;
    a speaker attached to said housing;

a first actuator for controlling movement of said housing about said vertical axis;

a second actuator for selectively extending and retracting said housing; and a control device connected to said first and second actuators by a plurality of conductors for remote operation of said actuators, whereby said actuators are capable of being operated by an automobile occupant situated in the front portion of the automobile;

said housing attached to said frame to rotate about a central horizontal axis, whereby, when moving from said retracted position to said extended position, said housing moves vertically upwards and rotates about said horizontal axis such that said speaker is directed generally toward the front portion of the automobile.

17. A speaker assembly as defined in claim 16, wherein said first and second actuators comprise electric motors.

* * * * *